(No Model.)  2 Sheets—Sheet 1.
C. F. BRUSH.
APPARATUS FOR MEASURING THE AMOUNT OF CURRENT ENERGY RECEIVED BY A SECONDARY BATTERY.
No. 281,176.  Patented July 10, 1883.
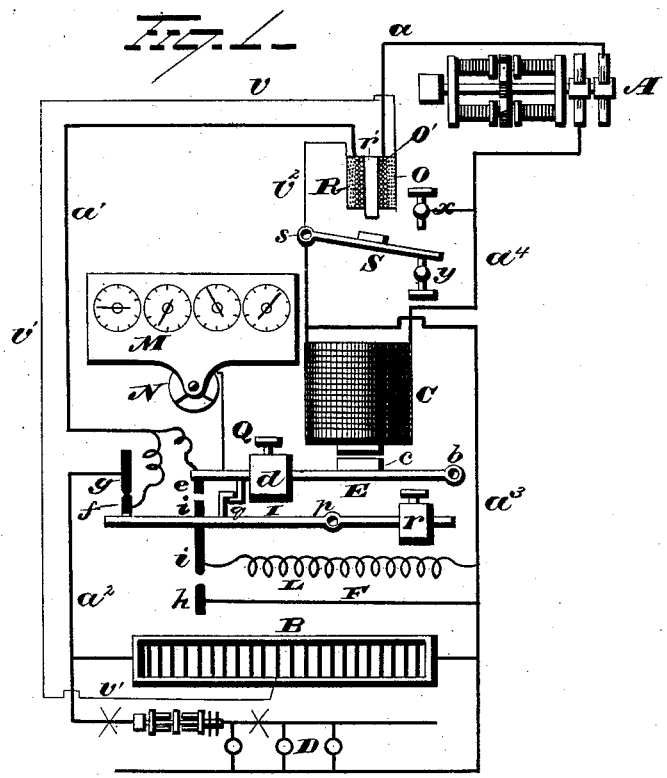
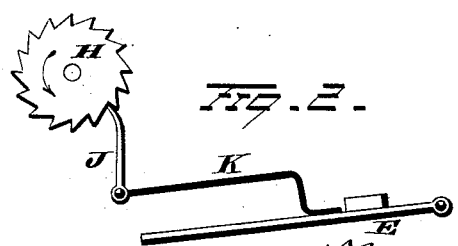
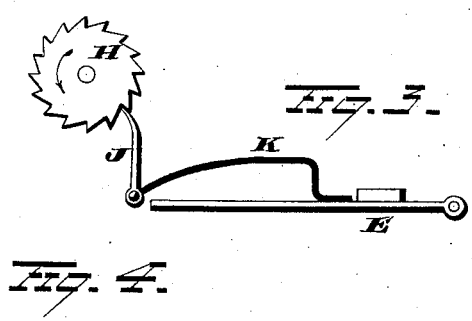
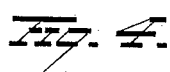
WITNESSES
A. D. Nottingham
George F. Downing.
INVENTOR
Chas. F. Brush.
By Leggett & Leggett
Attorney

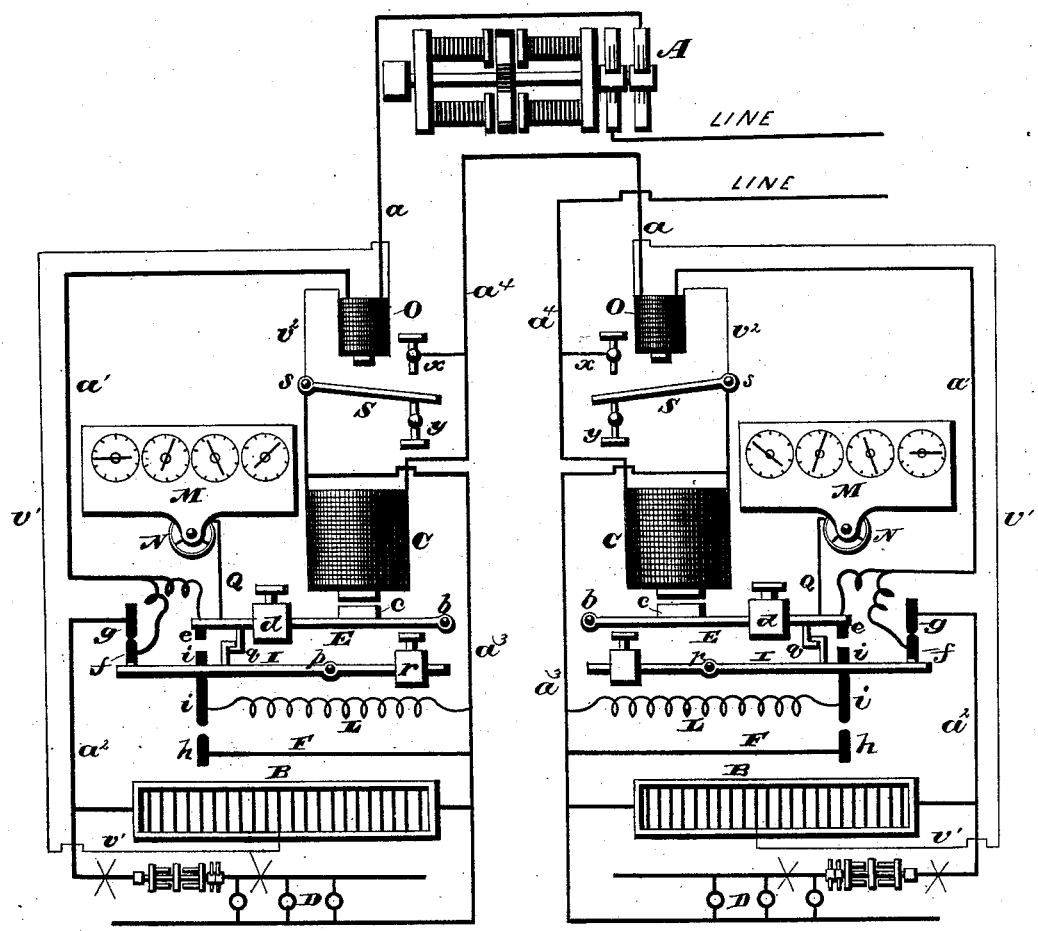

UNITED STATES PATENT OFFICE.

CHARLES F. BRUSH, OF CLEVELAND, OHIO.

APPARATUS FOR MEASURING THE AMOUNT OF CURRENT ENERGY RECEIVED BY A SECONDARY BATTERY.

SPECIFICATION forming part of Letters Patent No. 281,176, dated July 10, 1883.

Application filed June 13, 1882. (No model.) Patented in England July 1, 1882; in Belgium July 22, 1882; in Germany July 25, 1882; in France July 26, 1882; in Italy September 30, 1882; in Cape of Good Hope December 15, 1882; in Spain February 1, 1883; in Austria April 15, 1883; in Portugal May 2, 1883, and in India May 8, 1883.

*To all whom it may concern:*

Be it known that I, CHARLES F. BRUSH, of Cleveland, in the county of Cuyahoga and State of Ohio, have invented certain new and useful Improvements in a Method and Apparatus for Measuring the Amount of Current Energy Received by a Secondary Battery; and I do hereby declare the following to be a full, clear, and exact description of the invention, such as will enable others skilled in the art to which it pertains to make and use the same.

My invention relates to secondary batteries or apparatus for the storage of electrical energy; and it consists in devices hereinafter described, or their equivalents, for automatically measuring, indicating, or recording the amount of electrical energy spent in charging such batteries, while the charging-current may be applied at irregular intervals of time and for irregular lengths of time.

My invention is especially applicable to a system including several secondary batteries charged at intervals, wherein the several batteries are liable to be utilized or discharged to different extents from time to time or continuously.

In carrying out my invention I provide each battery of a system with an automatic mechanism for manipulating the charging-current, so constructed, arranged, and electrically connected that when a battery becomes fully charged the charging-current will be shunted away from the battery into another channel, or into another battery to be charged. With this automatic current-manipulator I combine a time-measuring device in such a manner that while the charging-current is acting to charge the battery the length of time it so acts will be recorded; but when the battery becomes fully charged, or the charging-current stops, the time-recording mechanism stops recording or stops entirely. Now, since the strength of the recording-current may be readily known, and may at all times be approximately constant, I have all the data necessary to determine the amount of electrical energy spent in charging each battery of a system of many batteries during any convenient length of time between observations of the recording apparatus—say one month. Again, the amount of energy required to charge a secondary battery is an accurate measure of (although in excess of) the amount of energy drawn from the battery since the previous time of charging. This draft of energy from the battery between, or between and during, the times of charging may obviously be little or much of the total capacity of the battery, and may be made rapidly or slowly, continuously or intermittently, according to the purposes for which the discharge is utilized. As a unit of electrical energy used from a secondary battery, (as indicated by the energy spent in charging it,) I propose a current of one ampere of one volt electro-motive force acting for one hour. The electro-motive force of one cell of a secondary battery of lead elements is rather more than two volts. The charging-current must be of higher electromotive force than this, while the discharging-current is of somewhat less electro-motive force, and is, under ordinary conditions of discharge, approximately two volts. Hence, by multiplying together twice the number of cells of a battery, the strength of the charging-current in amperes, and the number of hours it has acted we arrive at the number of arbitrary units of electrical energy from the battery.

In constructing my apparatus I may employ any known time-measuring device so arranged as to record time only when the charging-current is acting in a battery. To this end the time-measuring device may stop when the charging-current in the battery stops, or it may continue to run while the recording mechanism only is stopped. Again, the time-measuring mechanism—such, for instance, as a common clock-movement—may be actuated by a spring or weight, and allowed to run only while the charging-current is acting in the battery; or it may be actuated by the said charging-current through the intervention of a magnet or other suitable device, which will thus drive the clock only while the battery is being charged. The clock in either case is provided with a series of dials whereby its record of hours may be carried to any suitable number.

Although I shall describe a simple marine-clock movement as my time-measuring device, I do not in any manner limit myself to this, as any known sort of time-measuring mechanism may be employed without in any manner departing from the spirit of my invention.

In the drawings, Figure 1 illustrates an automatic current-manipulator for secondary battery charging combined with a time-recording apparatus. Fig. 2 is a detached view, showing the time-recording mechanism actuated by the charging-current, the parts being in the position they will have when the armature-lever is in its lowest position. Fig. 3 is a similar view, showing the position of parts when the armature-lever has been raised by the action of the current. Fig. 4 is a similar view, showing the position of parts after the spring has been exerted for a time in actuating the clock mechanism. Fig. 5 illustrates a system of secondary batteries all charged from one line, and each battery provided with an automatic current-manipulator and time-recording mechanism.

A represents a current-generator, which may consist of a dynamo or magneto electric machine or other apparatus capable of furnishing a suitable current.

B is a secondary battery.

C is an electro-magnet located in the circuit $a\ a'\ a^2\ a^3\ a^4$, connecting the generator and battery.

D represents a number of electric lamps, motors, or other translating devices.

E is a lever pivoted at $b$. This lever may be provided with an adjustable weight, $d$, if desired. The free end of the lever E carries a contact-point, $e$, which is connected by a flexible conductor, or otherwise, with the charging-line $a'$. Lever E is provided with an armature, $c$, facing the pole or poles of the magnet C. This lever may be of iron and the armature $c$ dispensed with.

I is a lever pivoted at $p$ and connected by catches $q$ (or an equivalent link) with the lever E in such a manner that I is held up by E when the latter rises, while lever E may fall independently of I. The lever I carries contact-points $f\ i$, which are insulated from each other. The lever I also carries a counter-weight, $r$, sufficient to raise the other end of the lever carrying the contacts. This contact-point $f$ is flexibly connected with the line $a'$, and the double contact-piece $i$ is flexibly connected with one end of a resistance, L, the other end of which is connected with the line $a^3$. This resistance may be made adjustable, if desired.

$g$ is a stationary contact-piece connected with the line $a^2$. This contact-piece forms a stop to the upward motion of the lever I, and ultimately to the lever E, through the intervention of the catches $q$. $h$ is another stationary contact-piece directly connected with the line $a^3$ by a conductor, F. This contact-piece forms a stop to the downward movement of the lever I, and also to that of the lever E through the intervention of the double contact-piece $i$.

O is a compound magnet, the inner helix, O', of which is located in the charging-circuit $a\ a'$. It is provided with an armature attached to a lever, S, pivoted at $s$. The whole lever may be of iron and the separate armature dispensed with. R is a helix of high resistance surrounding the helix O', whereby the core $r'$ is common to both helices. The electrical connections are so made that the main or charging current and the shunt current circulate in the same direction around the common core $r'$, and thereby act jointly in magnetizing the latter and attracting the armature-lever S. Helix R is arranged as a shunt around the whole or a part of the battery B by means of the conductors $v\ v'\ a^3\ v^2$, the current flowing through the conductor $v'\ v'\ v$, helix R, conductor $v^2$, and main-line or charging circuit $a^3$ to the other end of the battery. The conductor $a^3$ thus constitutes part of the charging and part of the shunt circuit, the effect being the same as if the conductor $v^2$ should be extended and connected with the battery to complete the shunt-circuit. When the lever S is raised by the magnet O, it makes contact with a stop, $x$, (which may be made adjustable,) which stop is connected with the line $a^4$.

$y$ is an adjustable stop limiting the fall of the lever S. The diagram just explained shows the various movable parts of the apparatus in the positions which they occupy while the generator A is charging the battery B. The current passes from the generator through the line $a$, helix O', line $a'$, contacts $f\ g$, line $a^2$, battery B, line $a^3$, magnet C, line $a^4$, and through any other apparatus there may be in the working or charging circuit, back to the generator. The magnet C, being energized by the current, will retain its armature in the position shown. The lever S is so adjusted that the charging-current will not energize the compound magnet sufficiently to raise it. While the battery B is charging, the difference of electrical potential between its ends, or between any two points of the battery, remains nearly constant; but when the battery becomes fully charged, free gases are evolved from its elements, and the difference of electrical potential between any two parts of the battery at once increases materially. The number of elements of the battery B energizing the helix R, and the distance of the armature S from the poles of the said magnet, are so adjusted that while the battery B is being charged the compound magnet will not be sufficiently energized by the main or charging current and the shunt-current to raise its armature S, while at the same time this adjustment is such that, when the potential of the battery B rises at the completion of the process of charging, the increased current thereby shunted through the helix R shall enable the magnet to raise its armature. This adjustment may also be effected through the agency of an adjustable weight (not shown) attached to the armature or armature-lever S. When the armature-lever S rises and makes contact with the stop $x$, the magnet C will be "short-circuited," because the current from the line $a^3$ may now pass through the lever S and stop $x$ to line $a^4$. Thus the magnet C is paralyzed sufficiently to allow the lever E to drop and the contact-point e to make contact with the conductor i i. Thus the whole or part of the current from the line a' is shunted from the battery B through the resistance L. The continued fall of the lever E, carrying with it the lever I, next breaks contact between the points f g, and thus disconnects the battery B from the line a', and leaves the whole current from the latter in the resistance L. Finally, the contact-piece i i makes contact with the piece h, thus "short-circuiting" the resistance L through the conductor F. This completes the operation of disconnecting the battery from the charging-line and short-circuiting the latter around the battery.

When a secondary battery discharges its current through a resistance sufficient to prevent a too rapid discharge, the electro-motive force of the battery remains nearly constant until its charge is nearly exhausted, after which the electro-motive force falls rapidly. Hence, by suitably adjusting the minimum distance of the armature S from its magnet by means of the adjustable contact-stop x, the armature S will fall when the electro-motive force of the battery B is reduced toward the close of the process of discharging. This will allow the magnet C to be energized, if current is acting in the line a a', &c., and the lever E will be raised, and with it the lever I, thus throwing the battery B into the charging-circuit. If current is not acting in the charging-circuit, then the magnet C will still be left ready to act when the charging-current has started again and reached its normal strength; but there are many objections to letting the battery B become nearly or quite discharged before recharging, one of which is that, should the battery become exhausted while the main or charging circuit a a', &c., is not supplied with current, the battery will for the time become useless. To avoid these difficulties, I use the compound magnet O, through the agency of which, when energized by the charging-current and by the current in the shunt-circuit connected with the battery, the magnet C is short-circuited when the battery is fully charged by the raising of the armature-lever S, as has been described; but when the charging-current stops, the compound magnet will be so weakened as to drop the armature S, and thus open the short circuit around the magnet C and leave the latter ready to act when the charging-current again starts, and all of this irrespective of any particular condition of the battery B.

Let us now follow the operation which takes place when the charging-current starts and the levers E I are at their lowest-points. Matters have been so adjusted by means of the adjustable weight d that the lever E will not respond to the attraction of the magnet C until the charging-current which excites the magnet has reached a certain strength, which is approximately its normal strength. Before this point is reached, however, the current may have been for some time charging other batteries, as hereinbefore explained. When the proper current strength is reached, the lever E rises until the contacts f g come together. It will be noticed that the weight of the lever E is available to maintain a good contact between the points e i i h until the instant of their positive separation. When the lever E begins to rise, the contact end of the lever I follows, owing to the counter-weight r, as before specified. Thus the contact e i is preserved while the contacts i h are opened, which operation throws the resistance L into the charging-circuit. Immediately thereafter the contact-points f g come together, arresting further movement of the lever I and throwing the battery B into the charging-circuit. The lever E, continuing to move upward, separates the contact-points e i and opens the resistance L, thus throwing all of the charging-current into the battery B. Finally, the upward movement of the lever E is arrested by the catches q, and the strong attraction of the magnet C for its armature is then exerted in maintaining a good contact between the points f g, through which all of the charging-current now passes.

Having described the construction and operation of the automatic current-manipulating devices, I will now explain the time-recording mechanism in connection therewith.

M is a marine-clock movement provided with a series of dials registering the number of hours the movement is allowed to run. The spring which actuates the clock-movement is manually wound from time to time, as may be necessary.

N is the balance-wheel of the movement. Q is a wire or other flexible arm attached to the lever E, and is so adjusted that when the lever is held in the raised position shown—that is, while the battery B is charging—the wire Q will be free from the balance-wheel N, and the latter will vibrate in obedience to the impulse given by the spring of the clock-movement. This adjustment is also such that when the lever E falls, which will happen when the battery B becomes fully charged, or when the charging-current stops, the wire Q will engage the balance N and stop its movement, and thereby arrest the registration of time. When the lever E again rises, the wire Q will not only free itself from the balance M, but will give the latter an impulse sufficient to insure its starting.

In Fig. 2, H is a ratchet-wheel at the beginning of a clock-train (not shown) similar to that shown at M, Fig. 1. The revolution of this ratchet-wheel actuates the train, which is not provided with other actuating mechanism. J is a pawl acting to rotate the wheel H, and attached to the free end of a stiff spring, K, carried by the lever E. When the lever E falls, the pawl assumes the position shown in Fig. 2, and when the lever E rises, the spring K is flexed, as shown in Fig. 3, and gives impulse to the ratchet H, whereby the clock-train thereto attached is actuated and time recorded. The spring K continues to drive the clock until it has, owing to the partial revolution of the ratchet H, assumed the position shown in Fig. 4; but before this point is reached the battery B will have become charged, the lever E will have fallen, and the registration of time will be stopped.

Fig. 5 illustrates a system wherein a current-generator is arranged to charge a series of secondary batteries, and each battery is provided with mechanism for automatically switching it into and out of the charging-circuit, and also with time-recording mechanism, as hereinbefore described.

All features of invention herein shown and described relative to switching a secondary battery into and out of its charging-circuit constitute the subject-matter of other applications filed by me, and therefore no claim to such invention is made in this application, excepting in connection with devices for measuring the amount of current energy received by a secondary battery.

The invention set forth in the foregoing specification is described in foreign patents granted to me as follows: Great Britain July 1, 1882; Belgium July 22, 1882; France July 26, 1882; Germany July 25, 1882; Cape of Good Hope December 15, 1882; Spain February 1, 1883; Austria April 15, 1883; Portugal May 2, 1883, and India May 8, 1883. The applications for all of the above-named foreign patents were filed subsequent to the date of the application for this patent.

Having fully described my invention, what I claim as new, and desire to secure by Letters Patent, is—

1. The combination, with an electric-current-generating apparatus, a charging-circuit, a secondary battery, and means for automatically switching the secondary battery into and out of the charging-circuit, of a time-recording device, and means whereby the time-recording device operates only when the charging-current is acting in said secondary battery, substantially as set forth.

2. The combination, with an electric-current generating apparatus, a main or charging circuit, a secondary battery, and means for automatically switching the secondary battery into the main or charging circuit when the charging-current has approximately reached its normal strength, and not until then, of a time-recording device, and means whereby the time-recording device is caused to operate at the instant the secondary battery is switched into the charging-circuit, substantially as set forth.

3. The combination, with an electric-current-generating apparatus, a main or charging circuit, a secondary battery, and means for automatically switching the secondary battery into the charging-circuit through the initial agency of the fall of electrical potential of said battery, of a time-recording device, and means whereby the time-recording device is caused to operate when the said battery is switched into the charging-circuit, substantially as set forth.

4. The combination, with an electric-current-generating apparatus, a main or charging circuit, a secondary battery, and means for automatically switching the secondary battery out of the charging-circuit, of a time-recording device, and means whereby the time-recording device operates when the charging-current is acting in said battery, and is stopped when said battery is switched out of the charging-circuit, substantially as set forth.

5. The combination, with an electric-current-generating apparatus, a main or charging circuit, a secondary battery, and means for automatically switching the secondary battery out of the charging-circuit through the initial agency of the rise of electrical potential of said battery, of a time-recording device, and means whereby said time-recording device is caused to operate when the charging-current is acting in said battery, and is stopped when said battery is switched out of the charging-circuit, substantially as set forth.

6. A system embracing an electric-current-generating apparatus, a main or charging circuit, two or more secondary batteries or groups of secondary batteries, devices connected with each of said batteries or group of batteries, said devices each constructed and adapted to automatically and independently switch its battery or group of batteries into the charging-circuit, and a time-recording device, and means connected or associated with each battery or group of batteries for automatically recording the time that the charging-current is acting in each battery or group of batteries, substantially as set forth.

7. A system embracing an electric-current-generating apparatus, a main or charging circuit, two or more secondary batteries or groups of secondary batteries, devices connected with each of said batteries or group of batteries, said devices each constructed and adapted to automatically and independently switch its battery or group of batteries into the charging-circuit when the charging-current has approximately reached its normal strength, and a time-recording device, and means connected or associated with each battery or group of batteries for automatically recording the time that the charging-current is acting in each battery or group of batteries, substantially as set forth.

8. A system embracing an electric-current generator, a main or charging circuit, two or more secondary batteries or groups of batteries, means associated with each battery or group of batteries for automatically and independently switching each battery or group of batteries out of the charging-circuit when sufficiently charged through the initial agency of the rise of electrical potential of the battery or group of batteries, which attends the completion of the charging process, and for automatically and independently switching each battery or group of batteries into the charging-circuit through the initial agency of the fall of electrical potential of the battery or group of batteries, which attends the near exhaustion of its charge, and a time-recording apparatus, and means connected or associated with each battery or group of batteries, whereby each time-recording apparatus is automatically and independently put into operation when its battery or group of batteries is switched into the charging-circuit, and is stopped when its battery or group of batteries is switched out of the charging-circuit, substantially as set forth.

9. A system embracing an electric-current generator, a main or charging circuit, two or more secondary batteries or groups of secondary batteries, having translating devices included in their discharging-circuits, means connected with each battery or group of batteries for automatically switching its battery or group of batteries and discharging-circuit into and out of the charging-circuit, and a time-recording apparatus connected with each secondary battery or group of batteries, and means for causing the time-recording apparatus to operate only while the charging-current is acting in the secondary battery or group of batteries with which it is connected, substantially as set forth.

10. The combination, with an electric-current-generating apparatus, a main or charging circuit, a secondary battery, and means for switching the secondary battery into and out of the charging-circuit, of a time-recording device, and means for giving a starting-impulse to the time-recording device, so as to insure its starting at the time the secondary battery is switched into the charging-circuit, substantially as set forth.

11. The combination, with an electric-current-generating apparatus, a main or charging circuit, a secondary battery, and means for automatically switching the secondary battery into and out of the charging-circuit, of a time-recording device, and means for giving a starting-impulse to the time-recording device, so as to insure its starting at the time the secondary battery is switched into the charging-circuit, substantially as set forth.

12. The combination, with an electric-current-generating apparatus, a main or charging circuit, a secondary battery, and means for automatically switching the secondary battery into and out of the charging-circuit, of a time-recording device, and means for driving the time-recording device by the power of the current during the time that the charging-current is acting in the secondary battery, substantially as set forth.

13. The combination, with an electric-current-generating apparatus, a main or charging circuit, a secondary battery, and means for automatically switching the secondary battery into and out of the charging-circuit, of a time-recording device, an electro-magnet, a spring, and means for storing power in the spring by the power of the magnet, and thereby driving the time-recording device while the charging-current is acting in the secondary battery, substantially as set forth.

In testimony whereof I have signed my name to this specification in the presence of two subscribing witnesses.

CHARLES F. BRUSH.

Witnesses:
LEVERETT L. LEGGETT,
ELBERT H. BAKER.